Feb. 18, 1969  D. R. KING ET AL  3,428,143
POWER STEERING SYSTEM
Filed Nov. 30, 1967

INVENTORS
D. R. KING
J. R. ALLEN
R. A. WITTREN

United States Patent Office 3,428,143
Patented Feb. 18, 1969

3,428,143
POWER STEERING SYSTEM
Donald Ray King, James Robert Allen, and Richard Arthur Wittren, Cedar Falls, Iowa, assignors to Deere & Company, Moline, Ill., a corporation of Delaware
Filed Nov. 30, 1967, Ser. No. 686,972
U.S. Cl. 180—79.2                    7 Claims
Int. Cl. B62d 5/08; F15b 9/00

ABSTRACT OF THE DISCLOSURE

A closed-center hydraulic steering system for a vehicle having a variable delivery hydraulic pump and including a double acting hydraulic cylinder mechanically connected to the steerable wheels, a rotatable steering shaft provided with a steering wheel at one end and coaxially connected to the cylinder piston through a helical thread so that rotation of the shaft also axially shifts the shaft, and a pair of poppet valves respectively responsive to movement of the shaft in opposite directions from a neutral position to supply pressurized fluid to the opposite ends of the cylinder.

Background of the invention

This invention relates to a hydraulic power steering system for vehicles such as agricultural tractors or the like.

Hydraulic power steering systems are, of course, well known on tractors as well as on other vehicles. Heretofore, tractors, like most other vehicles, have generally utilized open-center systems, such systems generally utilizing spool-type control valves for supplying the pressurized fluid for actuation of the power steering cylinders. However, it has been found that closed-center hydraulic systems offer certain advantages in agricultural tractors, especially in tractors with relatively large capacity hydraulic systems. Some tractors, having closed-center hydraulic systems, have retained open-center power steering systems, necessitating a separate pump, which, of cource, increases the cost and complexity of the machine. Although some tractors with closed-center hydraulic systems have utilized the main variable delivery pump to supply pressure for their power steering system, such systems have generally been of the hydrostatic type and have utilized spool-type valves, which require vary close fits to minimize undesirable leakage through the valve.

Summary of the invention

According to the present invention, a closed-center hydraulic power steering system is provided wherein poppet-type valves are utilized to control the flow of pressurized fluid to the hydraulic steering cylinder. More particularly, a system is provided wherein the steering cylinder is located at the end of the steering shaft and is connected to the steerable wheels through a mechanical linkage, the poppet valves being axially parallel to and adjacently offset from the steering shaft, the valves being actuated by axial shifting of the steering shaft. One feature of the invention resides in the fact that very little leakage occurs through the poppet-type steering valves, even though the valves are relatively simple and inexpensive to manufacture and assemble. Another feature of the invention is the compact and efficient arrangement of components wherein the valves and steering cylinder are mounted at the end of a relatively short steering shaft. Still another feature of the invention resides in the provision of means for positively disconnecting the side of the steering cylinder which is to be pressurized from the sump before pressurized fluid is ported to the cylinder.

Description of the preferred embodiment

Figures 1, 2:
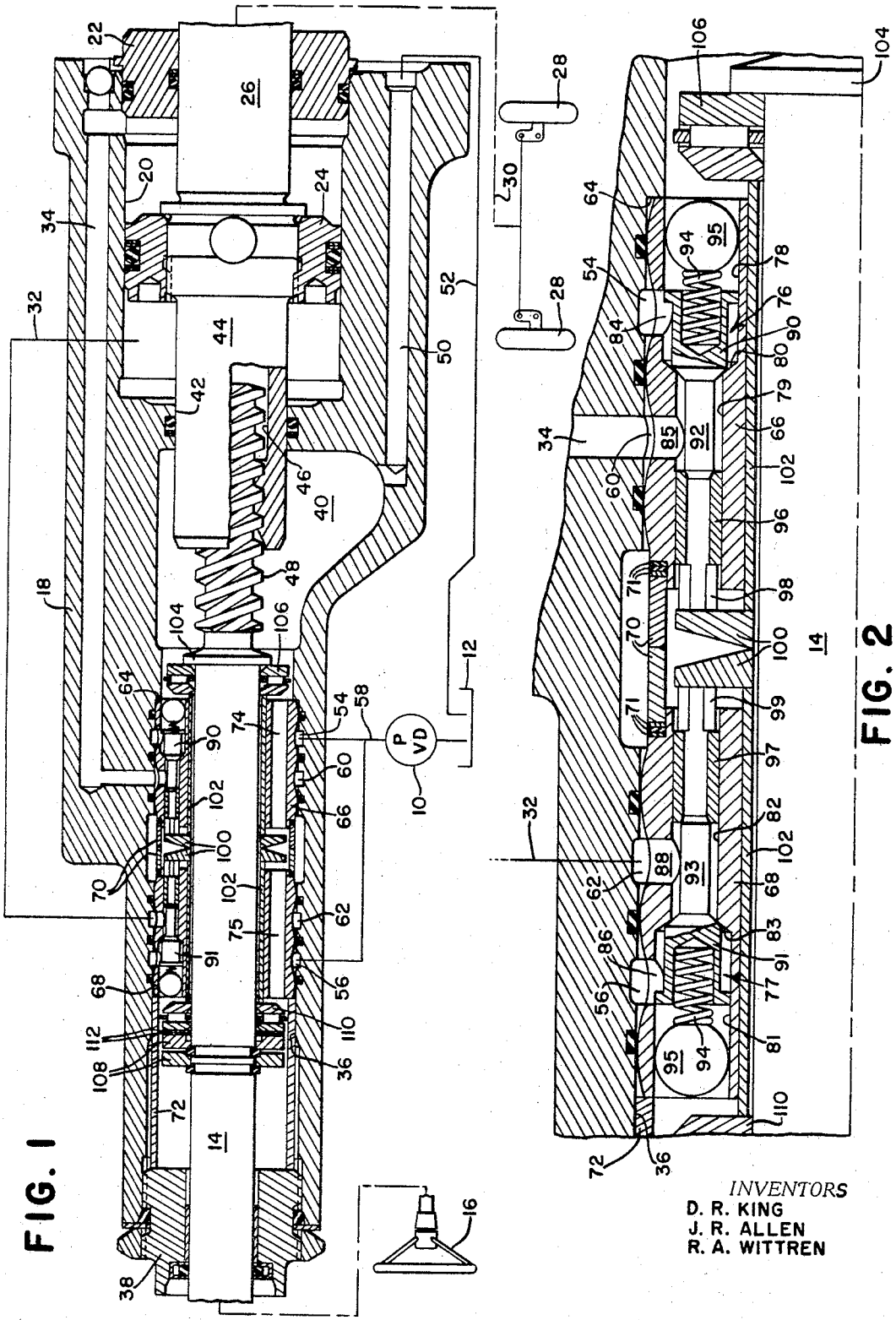
FIG. 1 is a partly schematic view of a power steering system, showing the valve and steering cylinder portion of the system in a section taken through the axis of the steering shaft and cylinder.
FIG. 2 is an enlarged sectional view of the control valve portion of the system.

The power steering system is preferably utilized on a tractor or the like having a closed-center hydraulic system, which includes a variable delivery main hydraulic pump 10, conventionally driven by the tractor engine, the pump having an associated reservoir 12.

A relatively short, generally downwardly extending steering shaft 14 is journaled on the tractor and has a conventional steering wheel 16 coaxially affixed to its upper end. The above orientation of the system on a tractor is for the purpose of clarity only, the words "forwardly," "rearwardly," "right," "left," etc. referring to a person facing the direction of forward travel of the tractor.

Mounted on the tractor at the lower end of the steering shaft 14 is a valve and cylinder body 18, the lower end of which is provided with a cylinder 20 having an annular end plate or member 22 mounted in its open end. A piston 24 is reciprocably mounted in the cylinder 20 and includes an axial output shaft 26 extending through and sealed by the end member 22. The output shaft 26 is connected to steerable front wheels 28 on the tractor by a suitable linkage 30, whereby movement of the piston 24 turns the wheels 28.

A hydraulic inlet passage 32, which is schematically illustrated in FIG. 1, communicates with the upper end of the cylinder while the lower side of the cylinder is connected to a hydraulic inlet passage 34, both passages extending through the body 18.

The upper end of the body 18 is also provided with a cylindrical bore 36, which is coaxial with the cylinder 20, the upper or open end of the bore being provided with an annular end member 38, which is threaded in and closes the end of the bore. The shaft 14 is rotatable and axially shiftable in the member 38 which provides an oil-tight seal around the shaft. The lower end of the bore 36 is connected to a cavity 40, which, in turn, is connected to the upper end of the cylinder 20 through a connecting bore 42. The piston 24 has a second shaft 44 extending in the opposite direction from the shaft 26 through the connecting bore 42 and into the cavity 40, the shaft 44 being slidable in but hydraulically sealed by the bore 42. The end of the shaft 44 has an internally threaded axial bore 46, which receives the externally threaded lower end 48 of the shaft 14, so that the piston 24 and the shaft 14 shift axially in unison when there is no relative angular motion between the piston and the shaft and shift axially relative to one another when there is such relative angular motion.

The cavity 40 is drained to sump via a passage 50 in the body and a sump line 52. The cylindrical bore 36 has a pair of axially spaced annular pressure inlet grooves 54 and 56 around its periphery, the grooves being connected to the pump outlet by a schematically illustrated pressure inlet line 58, partly formed by passages (not shown) in the body 18. A similar pair of axially spaced annular outlet grooves 60 and 62 is provided around the bore periphery between the grooves 54 and 56, the lower groove 60 being connected to the lower end of the cylinder 20 by the passage 34, while the upper groove 62 is connected to the upper end of the cylinder 20 via the schematically illustrated passage 32.

The lower end of cylindrical bore 36 is provided with an abutment 64 and a pair of annular members 66 and 68, having substantially the same diameter as the bore 36, are coaxially mounted in the bore 36 around the shaft 14, the annular members 66 and 68 being spaced apart by a pair of spacers 70, the spacing and location of the members 66 and 68 being adjustable by annular shims 71 between the spacers 70 and the members. A cylindrical sleeve 72 is mounted in the bore 36 between the upper end of the annular member 68 and the end member 38, which is threadable in the body 18 to axially clamp the sleeve 72, annular members 66 and 68, and spacers 70 against the abutment 64. A cylindrical passage 74 extends the length of the member 66 parallel to its axis and a similar passage 75 extends the length of the member 66, so that the upper end of the cylindrical bore 36 and the space between the members 66 and 68 are connected to the cavity 40 and consequently to the reservoir 12.

As best seen in FIG. 2, the outer peripheries of the members 66 and 68 are provided with annular depressions opposite the grooves 54, 60, 56, and 62, and appropriate seals in the bore 36 provide a seal between the bore and the members on opposite sides of each of the grooves.

As best seen in FIG. 2, the annular member 66 is provided with a poppet valve bore 76, which extends the length of the member parallel to its axis on the opposite side of the member from the passage 74, and the member 68 is provided with a similar valve bore 77. The bore 76 has larger and smaller diameter portions 78 and 79 respectively with a valve seat 80 between the two portions. Similarly, the bore 77 has larger and smaller diameter portions 81 and 82 with a valve seat 83 therebetween. The larger diameter portion 78 of the bore 76 communicates with the pressure inlet groove 54 through a radial passage 84 in the member 66 while the smaller diameter portion 79 is connected to the outlet groove 60 through a radial passage 85. Similarly, the larger diameter portion 81 of the bore 77 is connected to the pressure inlet groove 56 through a radial passage 86 while the smaller diameter portion 82 is connected to the outlet groove 62 through a radial passage 88.

Poppet valve members 90 and 91 are respectively axially shiftable in the larger diameter portions 78 and 81 and are respectively engageable with the valve seats 80 and 83 to disconnect the respective pressure inlet grooves from the outlet grooves. The poppet valve members 90 and 91 respectively have valve stems 92 and 93 which extend into the smaller diameter portions 79 and 82. Each valve member is also biased against its respective valve seat by a spring 94 acting between the valve seat and a ball 95 pressed into the end of the larger diameter portions of the respective valve bores.

Tubular members 96 and 97 are respectively mounted in the reduced diameter portions 79 and 82, the tubular members having substantially the same outside diameter as the diameter of the smaller portions of the valve bores and smaller inner diameters than the diameters of the valve stems 92 and 93, the tubular members being axially slidable in their respective valve bores and engageable with the ends of the valve stems to form poppet-type valves, which close the smaller diameter bore portions between the respective outlet passages 85 and 88 and the space between the annular members 66 and 68, which, as previously described, is connected to the reservoir. The interiors of the tubular members 96 and 97 are in fluid communication with said space between the members 66 and 68 through radial slots or passages 98 and 99 respectively in said members.

A pair of annular collars 100 are coaxially disposed on the shaft 14 in the space between the valve members 66 and 68, the opposite sides of the collars 100 being engageable with the slotted ends of the tubular members 96 and 97. While the collars 100 are rotatable and axially slidable on the shaft 14 themselves, their axial position relative to the shaft is fixed by a pair of sleeves 102 coaxially disposed on the shaft 14 on opposite sides of the collars 100, the lower sleeve engaging a shoulder 104 on the shaft 14 through a thrust bearing 106 while the upper sleeve engages a pair of locking rings 108 axially fixed on the shaft 14, the upper sleeve engaging the locking rings through a thrust bearing 110. Shims 112 are insertable between the lower locking ring and the thrust bearing 110 so that the collars 100, sleeves 102, and thrust bearings 106 and 110 are tightly clamped against the shoulder 104.

In operation, when the position of the wheels 28 corresponds to the position of the steering wheel 16, the steering system is in a neutral condition, as shown in the drawings. In this position, the valve members 90 and 91 engage their respective valve seats 80 and 83 to disconnect the pressure inlet grooves 54 and 56 from the motor outlet grooves 60 and 62. Preferably, when the valve members 90 and 91 are in their seated position and the tubular members 96 and 97 engage the collars 100, the ends of valve stems 92 and 93 do not fully seat against the members 96 and 97, so that a small amount of leakage through the poppet-type valves formed by the engagement of the valve stems with the ends of the tubular members is possible, although, essentially, the piston 24 is hydraulically locked since both ends of the cylinder 20 are disconnected from the pressure source and have only a restricted flow to the reservoir.

To turn the vehicle to the right from the direction it is traveling when the system is in neutral condition, the steering wheel 16 is turned in a clockwise direction. Since the piston 24 is hydraulically locked for all practical purposes, rotation of the shaft 14 will cause the shaft to shift downwardly (to the right in the drawings) as a result of the threaded connection between the shaft and the piston. This downward movement of the shaft is transmitted to the collars 100 through the sleeves 102, thrust bearing 110, and locking rings 108. As soon as the collars 100 start to move, the lower collar engages the end of the tubular member 96, forcing it against the end of the valve stem 92 to positively seat the member 96 against the valve stem, thereby disconnecting the passage 85, the outlet groove 60, and the outlet passage 34 from the reservoir. As soon as the tubular member seats against the valve stem, the movement of the collar 100 is transmitted to the valve member 90, lifting the valve member off the seat 80 against the bias of the spring 94, connecting the pressure inlet groove 54 to the outlet groove 60 via the radial passage 84, the larger and smaller bore portions 78 and 79, and the radial passage 85. Also as the collars 100 move downwardly, they move away from the tubular member 97, and, as soon as the piston 24 starts to move as a result of the pressure being ported thereto through the opened poppet valve, the pressure in the other side of the cylinder rises and is transmitted via the line 32, the groove 62, and the passage 88 to the upper end of the tubular member 97, causing it to shift downwardly (to the right in the drawings), away from the valve stem 93, thereby opening the passage 88 and consequently the upper end of the cylinder to sump.

The pressurization of the lower side of the cylinder causes the piston to move upwardly (to the left in the drawings) and, as long as the angular position of the steering shaft 14 remains unchanged, the upward movement of the piston is transmitted to the shaft 14, so that as soon as the piston 24 moves a distance which corresponds to the initial shift of the shaft 14 caused by its initial rotation, the shaft is returned to its neutral position, as shown in the drawing, wherein both valve members 90 and 91 are seated. Obviously, the further the steering wheel 16 is turned to the right, the greater the initial axial shift of the shaft 14, and the further the piston 24 will have to travel to return the system to neutral, the motion of the piston 24 being transmitted to the steerable wheels 28 as previously described. Thus, after a short delay, the length of which is determined by the flow rate to the steering cylinder and the amount of movement necessary, the position of the wheels 28 will correspond to the position of the steering wheel 16.

Of course, the turn the vehicle wheels to the left from any predetermined position, the steering wheel 16 is turned in a counterclockwise direction, causing an initial upward shifting of the shaft 14 (to the left in the drawings) so that the collars 100 engage the tubular member 97, initially positively shutting off the upper end of the cylinder 20 from the sump and thereafter raising the valve member 91 from the valve seat 83, so that pressurized fluid from the pressure inlet groove 56 is ported to the upper end of the cylinder via the passage 86, the smaller and larger diameter groove portions 82 and 81, the passage 88, the outlet groove 62, and the cylinder inlet passage 32. The lower end of the cylinder is open to the sump since the pressure buildup in the lower end of the cylinder will cause the tubular valve seat 96 to move away from the valve stem 92.

Although only one set of poppet valves is shown in each annular valve member, similar valves could be provided at various angular intervals around the valve member. The additional valves would, of course, increase the flow rate and thereby the steering response rate through the valves, although, the additional valve sets would also increase the cost and complexity of the system.

As is apparent from the drawing, the axial travel of the shaft is quite limited and corresponds to less than one quarter of a turn of the shaft. However, the response rate of the system is such that, in normal turns, the piston movement lags the steering wheel by a lesser amount than would cause the steering shaft to engage its stops. If, due to a hydraulic failure or too slow a response rate, the shaft does reach a stop, the rotation of the shaft shifts the piston so that the wheels are mechanically steered. For example, if, during a right-hand turn, the shaft 14 shifts downwardly so that the upper thrust bearing 110 engages the upper end of the member 68 to prevent additional axial movement of the shaft, further clockwise rotation of the shaft would mechanically pull the piston upwardly to turn the wheels, the pressure in the upper end of the cylinder being dumped through the tubular member 97 as previously described.

The use of the poppet-type valves provides a power steering system with a minimum amount of leakage. Moreover, as should be apparent from the above, manufacturing tolerances need not be as close as with spool-type valves, and the use of the shims 112 and 71 provides adjustments that permit wider manufacturing and assembly tolerances. Also, the mounting of the steering cylinder and control valves in a single body at the end of the steering shaft provides a compact and efficient arrangement of components.

We claim:

1. A power steering system comprising: a variable delivery hydraulic pump having an associated reservoir; a reversible hydraulic motor actuatable in opposite directions in response to alternate pressurization of its alternate inlets, said motor being operatively connected to a pair of steerable wheels for turning the wheels in alternate directions in response to said actuation in alternate directions; a manually rotatable steering wheel; and closed-center control valve means actuatable in response to rotation of the steering wheel for supplying fluid under pressure from the pump to the hydraulic motor and including a valve body having a cylindrical bore, first and second outlet passages respectively connected to the alternate motor inlets, a pressure passage means connected to the pump and a sump passage means connected to the reservoir, a steering shaft coaxially rotatable in the bore and axially shiftable in the bore in opposite directions from a neutral position, the shaft being operatively connected to the steering wheel for rotation in response to rotation of the steering wheel, means operatively connecting the shaft to the hydraulic motor for axial movement of the shaft in opposite directions in response to actuation of the motor in its opposite directions or in response to rotation of the shaft relative to the motor, first and second poppet valve means mounted within the valve body and respectively shiftable between open positions wherein they respectively connect the pressure passage means to the first and second outlet passages and closed positions wherein they disconnect the pressure passage means from the respective outlet passages, means biasing the poppet valves toward their closed positions, and means operative between the shaft and the first and second poppet valve means for shifting the first poppet valve means to its open position in response to axial movement of the shaft in one direction from its neutral position and the second valve means to its open position in response to axial movement of the shaft in the other direction from its neutral position.

2. The invention defined in claim 1 wherein the hydraulic motor includes a cylinder and a reciprocatable piston mounted therein and connected to the wheels, the alternate motor inlets communicating with the cylinder on opposite sides of the piston, and the connecting means between the motor and the shaft coaxially connects the shaft to the piston and includes helical thread means with one thread element connected to the shaft and the other thread element connected to the piston, whereby rotation of the shaft axially shifts the shaft relative to the piston.

3. The invention defined in claim 2 wherein the steering wheel is coaxially attached to the shaft.

4. The invention defined in claim 3 wherein each poppet valve means includes an annular member coaxially mounted in the body bore and around the shaft, each annular member having at least one poppet valve bore parallel to the axis of said member with an enlarged and a reduced diameter portion and a valve seat between the two portions, a poppet valve element in each poppet valve bore engageable with the valve seat to disconnect the enlarged and reduced diameter portions, a spring means operatively engaging each valve element for biasing it against its respective seat, and conduit means connecting the enlarged diameter portion of each poppet valve bore to the pressure passage means, the first poppet valve means also including conduit means for connecting the reduced diameter portion of each of its poppet valve bores to the first outlet passage and the second poppet valve means including conduit means for connecting the reduced diameter portion of each of its poppet valve bores to the second outlet passage.

5. The invention defined in claim 4 and including a tubular member coaxially shiftable in the reduced diameter portion of each poppet valve bore, one end of each tubular member being engageable with and closeable by the poppet valve element in the same poppet valve bore when the poppet valve means is shifted toward its open position, the other end of each tubular element being in fluid communication with the sump passage means.

6. The invention defined in claim 5 wherein the means operative between the shaft and the poppet valve means includes a collar means mounted on and axially shiftable with the shaft and engageable with the tubular member in each poppet valve bore of the first poppet valve means to shift the tubular member and open the associated poppet valve element when the shaft is shifted in one direction from its neutral position and engageable with the tubular member in each poppet valve bore of the second poppet valve means to shift the tubular member and open the associated poppet valve elements when the shaft is shifted in the other direction from its neutral position.

7. The invention defined in claim 1 and including third and fourth poppet valve means mounted in the valve body and respectively shiftable between open positions wherein they respectively connect the first and second outlet passages to the sump passage means and closed positions wherein they disconnect the outlet passages from the sump passage means, and the means operative between the shaft and the first and second poppet valve means operates to positively shift the third poppet valve means to its closed position before the first poppet valve means is shifted to its open position and to shift the fourth poppet valve means to its closed position before the second poppet valve means is shifted to its open position.

References Cited
UNITED STATES PATENTS

| | | | |
|---|---|---|---|
| 2,833,253 | 5/1958 | Wittren | 137—625.66 |
| 3,075,500 | 1/1963 | Mazur et al. | 91—380 |
| 3,241,630 | 3/1966 | Snabes | 180—79.2 |
| 3,381,712 | 5/1968 | Wittren et al. | 91—380 |

BENJAMIN HERSH, *Primary Examiner.*

L. DANIEL MORRIS, JR., *Assistant Examiner.*

U.S. Cl. X.R.

91—380